(12) United States Patent
Gillett et al.

(10) Patent No.: US 9,717,090 B2
(45) Date of Patent: *Jul. 25, 2017

(54) PROVIDING NOTIFICATIONS OF CALL-RELATED SERVICES

(71) Applicant: Microsoft Technology Licensing, LLC, Redmond, WA (US)

(72) Inventors: Mark Alastair Gillett, London (GB); Manrique Brenes, Laguna Beach, CA (US); Theo Short, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/752,298

(22) Filed: Jan. 28, 2013

(65) Prior Publication Data

US 2013/0136089 A1    May 30, 2013

Related U.S. Application Data

(63) Continuation-in-part of application No. 13/340,524, filed on Dec. 29, 2011.
(Continued)

(51) Int. Cl.
*H04W 72/04* (2009.01)
*H04L 12/18* (2006.01)
(Continued)

(52) U.S. Cl.
CPC ....... *H04W 72/048* (2013.01); *H04L 12/1822* (2013.01); *H04L 51/04* (2013.01);
(Continued)

(58) Field of Classification Search
None
See application file for complete search history.

(56) References Cited

U.S. PATENT DOCUMENTS 5,305,244 A    4/1994    Newman et al.
6,061,434 A    5/2000    Corbett
(Continued)

FOREIGN PATENT DOCUMENTS

CN    1694527    11/2005
CN    101039307    9/2007
(Continued)

OTHER PUBLICATIONS

"Bluetooth Profile", downloaded Jun. 28, 2010 from http://en.wikipedia.org/w/index.php?title=Bluetooth_profile&oldid=330823199, accessed Dec. 10, 2009, 9 pages.
(Continued)

*Primary Examiner* — Chirag Shah
*Assistant Examiner* — Srinivasa Reddivalam (57) ABSTRACT

A first near-end terminal is able to conduct voice or video calls with at least one far-end terminal via a packet-based communication system, the first near-end terminal being a mobile user terminal of a near-end user. The first near-end terminal is enabled to discover proximity of at least one second near-end terminal available to provide a resource for use by the near-end user in conjunction with the first near-end terminal when conducting one of said calls, the resource being for use in conducting at least part of the call or in conjunction with the call. The first near-end terminal is also arranged, based on discovering said proximity, to present the near-end user with a message indicating the availability of the second near-end terminal to provide the resource when conducting the call.

20 Claims, 3 Drawing Sheets

Related U.S. Application Data (60) Provisional application No. 61/428,937, filed on Dec. 31, 2010.

(51) Int. Cl.
  *H04L 12/58* (2006.01)
  *H04W 4/02* (2009.01)
  *H04L 29/06* (2006.01)
  *H04L 29/08* (2006.01)

(52) U.S. Cl.
  CPC .......... *H04L 51/20* (2013.01); *H04L 65/1069* (2013.01); *H04L 65/1093* (2013.01); *H04L 67/16* (2013.01); *H04W 4/023* (2013.01); *H04L 67/10* (2013.01)

(56) References Cited

U.S. PATENT DOCUMENTS

| | | |
|---|---|---|
| 6,243,129 B1 | 6/2001 | Deierling |
| 6,321,080 B1 | 11/2001 | Diethorn |
| 6,449,284 B1 | 9/2002 | Hagirahim |
| 6,532,482 B1 | 3/2003 | Toyosato |
| 6,636,269 B1 | 10/2003 | Baldwin |
| 6,654,722 B1 | 11/2003 | Aldous et al. |
| 6,778,528 B1 | 8/2004 | Blair et al. |
| 6,904,025 B1 | 6/2005 | Madour et al. |
| 6,930,661 B2 | 8/2005 | Uchida et al. |
| 6,985,961 B1 | 1/2006 | Ramsayer et al. |
| 7,039,205 B1 | 5/2006 | Carter et al. |
| 7,260,186 B2 | 8/2007 | Zhu et al. |
| 7,301,919 B2 | 11/2007 | Sundquist et al. |
| 7,526,253 B2 | 4/2009 | Fujioka |
| 7,668,537 B2 | 2/2010 | De Vries |
| 7,673,001 B1 | 3/2010 | Battle et al. |
| 7,693,133 B2 | 4/2010 | Benco et al. |
| 7,747,010 B1 | 6/2010 | Rowe et al. |
| 7,751,848 B2 | 7/2010 | Vishwanathan et al. |
| 7,769,837 B2 | 8/2010 | Nogawa et al. |
| 7,908,630 B2 | 3/2011 | Crandall et al. |
| 7,920,690 B2 | 4/2011 | Sylvain |
| 7,995,721 B2 | 8/2011 | Gallick et al. |
| 8,090,780 B2 | 1/2012 | Hjelmeland Almas et al. |
| 8,223,747 B2 | 7/2012 | Yarlagadda et al. |
| 8,249,056 B2 | 8/2012 | Ku |
| 8,301,757 B2 | 10/2012 | Catlin et al. |
| 8,311,833 B2 | 11/2012 | Natesan |
| 8,352,260 B2 | 1/2013 | Sung |
| 8,369,498 B2 | 2/2013 | Dinka et al. |
| 8,407,749 B2 | 3/2013 | McLaughlin et al. |
| 8,413,199 B2 | 4/2013 | Laasik et al. |
| 8,421,839 B2 | 4/2013 | Kert |
| 8,451,315 B2 | 5/2013 | Lee |
| 8,520,050 B2 | 8/2013 | Blackburn et al. |
| 8,593,501 B1 * | 11/2013 | Kjeldaas ............... H04N 7/15 348/14.01 |
| 8,917,832 B2 | 12/2014 | Catlin et al. |
| 8,963,982 B2 | 2/2015 | MacDonald |
| 9,019,336 B2 | 4/2015 | Lindblom et al. |
| 9,398,164 B2 | 7/2016 | Gillett |
| 9,521,360 B2 | 12/2016 | Macdonald |
| 2002/0034166 A1 | 3/2002 | Barany et al. |
| 2002/0040377 A1 | 4/2002 | Newman et al. |
| 2003/0023730 A1 | 1/2003 | Wengrovitz et al. |
| 2003/0058805 A1 | 3/2003 | Meyerson et al. |
| 2003/0177099 A1 | 9/2003 | Gallant et al. |
| 2004/0083297 A1 | 4/2004 | Gazzetta et al. |
| 2004/0194146 A1 | 9/2004 | Bates et al. |
| 2005/0021872 A1 | 1/2005 | Poustchi et al. |
| 2005/0031092 A1 | 2/2005 | Umemura et al. |
| 2005/0034079 A1 | 2/2005 | Gunasekar et al. |
| 2005/0122963 A1 | 6/2005 | Jeon et al. |
| 2005/0197061 A1 | 9/2005 | Hundal |
| 2005/0268334 A1 | 12/2005 | Hesselink et al. |
| 2005/0278778 A1 | 12/2005 | D'Agostino et al. |
| 2006/0013194 A1 | 1/2006 | Baumann et al. |
| 2006/0026288 A1 | 2/2006 | Acharya et al. |
| 2006/0045070 A1 | 3/2006 | Fotta et al. |
| 2006/0143425 A1 | 6/2006 | Igarashi et al. |
| 2006/0165050 A1 | 7/2006 | Erhart et al. |
| 2006/0221174 A1 | 10/2006 | Yang et al. |
| 2007/0091833 A1 | 4/2007 | Bauchot et al. |
| 2007/0115348 A1 | 5/2007 | Eppel et al. |
| 2007/0120949 A1 | 5/2007 | Chuang |
| 2007/0223370 A1 | 9/2007 | Spear |
| 2007/0244611 A1 | 10/2007 | Brozovich |
| 2007/0280200 A1 | 12/2007 | Patel |
| 2007/0286202 A1 | 12/2007 | Dos Remedios et al. |
| 2008/0032703 A1 | 2/2008 | Krumm et al. |
| 2008/0062940 A1 | 3/2008 | Othmer et al. |
| 2008/0062962 A1 | 3/2008 | Luck et al. |
| 2008/0069069 A1 | 3/2008 | Schessel et al. |
| 2008/0069087 A1 * | 3/2008 | Igoe ................... H04L 12/2809 370/352 |
| 2008/0075240 A1 | 3/2008 | Ramanathan et al. |
| 2008/0081698 A1 | 4/2008 | Wormald et al. |
| 2008/0091682 A1 | 4/2008 | Lim |
| 2008/0094371 A1 | 4/2008 | Forstall et al. |
| 2008/0114993 A1 | 5/2008 | Shankar et al. |
| 2008/0157998 A1 | 7/2008 | Zuo et al. |
| 2008/0177904 A1 | 7/2008 | Storey et al. |
| 2008/0182546 A1 | 7/2008 | Wang et al. |
| 2008/0195394 A1 | 8/2008 | Francioli |
| 2008/0235587 A1 | 9/2008 | Heie et al. |
| 2008/0238701 A1 | 10/2008 | Bickel et al. |
| 2008/0239995 A1 | 10/2008 | Lee et al. |
| 2009/0017792 A1 | 1/2009 | Matsumoto et al. |
| 2009/0034513 A1 | 2/2009 | McMullin |
| 2009/0046839 A1 | 2/2009 | Chow et al. |
| 2009/0049190 A1 | 2/2009 | Jiang et al. |
| 2009/0094684 A1 | 4/2009 | Chinnusamy et al. |
| 2009/0136016 A1 | 5/2009 | Gornoi et al. |
| 2009/0138697 A1 | 5/2009 | Kim |
| 2009/0143053 A1 | 6/2009 | Levien et al. |
| 2009/0168756 A1 | 7/2009 | Kurapati et al. |
| 2009/0172170 A1 | 7/2009 | Rey |
| 2009/0175509 A1 | 7/2009 | Gonion et al. |
| 2009/0177601 A1 | 7/2009 | Huang et al. |
| 2009/0185792 A1 | 7/2009 | Braunstein et al. |
| 2009/0225750 A1 | 9/2009 | Hawkins |
| 2009/0232084 A1 | 9/2009 | Li et al. |
| 2009/0238170 A1 | 9/2009 | Rajan et al. |
| 2009/0280789 A1 | 11/2009 | Takumo et al. |
| 2009/0282130 A1 | 11/2009 | Antoniou et al. |
| 2009/0299735 A1 | 12/2009 | Bouvet et al. |
| 2010/0008523 A1 | 1/2010 | Demuynck et al. |
| 2010/0020729 A1 * | 1/2010 | Walley ............... H04M 1/6066 370/277 |
| 2010/0046731 A1 | 2/2010 | Gisby et al. |
| 2010/0056055 A1 * | 3/2010 | Ketari ................ H04L 63/068 455/41.3 |
| 2010/0060715 A1 | 3/2010 | Laasik et al. |
| 2010/0157013 A1 | 6/2010 | Sylvain |
| 2010/0216402 A1 | 8/2010 | Appleby et al. |
| 2010/0265312 A1 | 10/2010 | Choi et al. |
| 2011/0021200 A1 | 1/2011 | Yi et al. |
| 2011/0047282 A1 | 2/2011 | Denman et al. |
| 2011/0110504 A1 | 5/2011 | Kaal et al. |
| 2011/0119490 A1 | 5/2011 | Kaal et al. |
| 2011/0141925 A1 | 6/2011 | Velenko et al. |
| 2011/0151892 A1 | 6/2011 | Vengroff et al. |
| 2011/0177801 A1 | 7/2011 | Heit et al. |
| 2011/0179180 A1 | 7/2011 | Schleifer et al. |
| 2011/0216671 A1 * | 9/2011 | Walley ............... H04L 12/2809 370/255 |
| 2011/0222466 A1 * | 9/2011 | Pance ................. H04Q 3/0029 370/316 |
| 2011/0242266 A1 | 10/2011 | Blackburn et al. |
| 2011/0242268 A1 | 10/2011 | Kim et al. |
| 2011/0242270 A1 | 10/2011 | Dinka et al. |
| 2011/0243125 A1 | 10/2011 | Kaal et al. |
| 2011/0243140 A1 | 10/2011 | Blackburn et al. |
| 2011/0243141 A1 | 10/2011 | Blackburn et al. |
| 2011/0244955 A1 | 10/2011 | Dinka et al. |

(56) References Cited

U.S. PATENT DOCUMENTS

| | | |
|---|---|---|
| 2011/0261143 A1 | 10/2011 | Ponsford |
| 2012/0062758 A1 | 3/2012 | Devine et al. |
| 2012/0066722 A1 | 3/2012 | Cheung et al. |
| 2012/0087367 A1 | 4/2012 | Anikin |
| 2012/0105475 A1 | 5/2012 | Tseng |
| 2012/0169831 A1 | 7/2012 | Nietfeld et al. |
| 2012/0173897 A1* | 7/2012 | Karkaria ............. G06F 9/445 713/300 |
| 2012/0176976 A1 | 7/2012 | Wells |
| 2012/0182988 A1 | 7/2012 | Brenes et al. |
| 2012/0206553 A1 | 8/2012 | MacDonald |
| 2012/0207147 A1 | 8/2012 | MacDonald |
| 2012/0278454 A1 | 11/2012 | Stewart et al. |
| 2013/0072173 A1 | 3/2013 | Brady |
| 2013/0106587 A1 | 5/2013 | Reams |
| 2013/0169736 A1 | 7/2013 | Lindblom |
| 2013/0230023 A1 | 9/2013 | Gray et al. |
| 2014/0016608 A1* | 1/2014 | Buer ............... H04L 12/5691 370/329 |
| 2014/0073300 A1 | 3/2014 | Leeder et al. |
| 2014/0112333 A1 | 4/2014 | Oberle et al. |
| 2014/0122244 A1* | 5/2014 | Arrasvuori ........... G06Q 30/00 705/14.64 |
| 2014/0211666 A1 | 7/2014 | Gillett |
| 2014/0218460 A1 | 8/2014 | Benzaia et al. |
| 2015/0124042 A1 | 5/2015 | MacDonald |
| 2016/0044574 A1* | 2/2016 | Naqvi ............... H04W 4/001 455/410 |

FOREIGN PATENT DOCUMENTS

| | | |
|---|---|---|
| CN | 101427557 | 5/2009 |
| CN | 102257791 | 11/2011 |
| EP | 1475939 | 11/2004 |
| EP | 1592198 | 11/2005 |
| EP | 1816843 | 8/2007 |
| EP | 1909467 | 4/2008 |
| EP | 2063612 | 5/2009 |
| EP | 2088735 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO-2005008524 | 1/2005 |
| WO | WO2005009019 | 1/2005 |
| WO | WO-2005009019 | 1/2005 |
| WO | WO-2005057969 | 6/2005 |
| WO | WO-2006051492 | 5/2006 |
| WO | WO-2006058036 | 6/2006 |
| WO | WO-2007023208 | 3/2007 |
| WO | WO-2007137485 | 6/2007 |
| WO | WO-2007118250 | 10/2007 |
| WO | WO-2007126652 | 11/2007 |
| WO | WO-2008015369 | 2/2008 |
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |
| WO | WO-2010026194 | 3/2010 |
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

"Femtocell", downloaded Jun. 28, 2010 from http://en.wikipedia.org/w/iindex.php?title=Femtocell&oldid=330068819, accessed Dec. 10, 2009, 8 pages.

"Final Office Action", U.S. Appl. No. 12/290,232, (Dec. 6, 2012), 18 pages.

"Final Office Action", U.S. Appl. No. 12/843,543, (Aug. 3, 2012), 8 pages.

"International Search Report and Written Opinion", PCT/EP2011/054781, (May 23, 2011), 13 pages.

"International Search Report and Written Opinion", PCT/EP2011/054864, (May 31, 2011), 13 pages.

"International Search Report and Written Opinion", Application No. PCT/EP2011/054862, (Jun. 27, 2011),17 pages.

"International Search Report and Written Opinion", Application No. PCT/EP2011/054881, (Jul. 25, 2011),18 pages.

"International Search Report and Written Opinion", International Application No. PCT/EP2011/074303, (May 29, 2012),11 pages.

"International Search Report and Written Opinion", PCT Application PCT/EP2010/066562, (Feb. 23, 2011),11 pages.

"International Search Report and Written Opinion", PCT Application PCT/EP2010/066561, (Sep. 26, 2011),13 pages.

"International Search Report and Written Opinion", PCT Application PCT/EP2011/054879, (Jun. 24, 2011),13 pages.

"International Search Report", Application No. PCT/EP2011/074304, (Feb. 7, 2012), 3 pages.

"IP-DECT", downloaded Jun. 28, 2010 from http://en.wikipedia.org/w/index.phptitle=IPECT&oldid=322769463, accessed Dec. 10, 2009, (Oct. 29, 2009), 1 page.

"MagicJack Harnesses Femtocell for VoIP", downloaded Jun. 28, 2010 from http://.pcworld.com/article/186308/magicjack_femtocell_for_voip.html, dated Jan. 8, 2010, accessed Feb. 4, 2010, 7 pages.

"Non-Final Office Action", U.S. Appl. No. 12/290,232, (Jun. 11, 2012),16 pages.

"Non-Final Office Action", U.S. Appl. No. 12/824,681, (Oct. 10, 2012),13 pages.

"Non-Final Office Action", U.S. Appl. No. 12/843,543, (May 29, 2012), 9 pages.

"Non-Final Office Action", U.S. Appl. No. 12/843,569, (Apr. 4, 2012),13 pages.

"Non-Final Office Action", U.S. Appl. No. 12/941,585, (Dec. 31, 2012),11 pages.

"PCT Search Report and Written Opinion", Application No. PCT/EP2011/074302, (Mar. 6, 2012),11 pages.

"Search Report", Application No. GB1005462.5, (Jul. 28, 2011), 2 pages.

"Search Report", GB Application 0919591.8, (Feb. 23, 2011), 2 pages.

"Search Report", GB Application 0919592.6, (Feb. 24, 2011), 1 page.

"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.

David, et al., "A Location-Based Notification- and Visualization-System Indicating Social Activities", (Jan. 28, 2009), 7 pages.

Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.

Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.

Saint-Andre, Peter "Streaming XML with Jabber/XMPP", IEEE Internet Computing, vol. 9, No. 5,(Sep. 1, 2005), pp. 82-89.

"Non-Final Office Action", U.S. Appl. No. 13/340,508, Mar. 12, 2014, 9 pages.

"PCT Search Report and Written Opinion", Application No. PCT/US2012/072025, (Mar. 26, 2013),12 pages.

"Final Office Action", U.S. Appl. No. 13/340,508, Jun. 24, 2014, 7 pages.

"International Search Report and Written Opinion", Application No. PCT/US2014/013086, Jul. 24, 2014, 8 Pages.

"Non-Final Office Action", U.S. Appl. No. 13/340,524, Sep. 2, 2014, 10 pages.

(56) References Cited

OTHER PUBLICATIONS

"Non-Final Office Action", U.S. Appl. No. 13/710,041, Jul. 8, 2014, 11 pages.
"Foreign Notice of Allowance", EP Application No. 11808879.8, Aug. 20, 2014, 7 pages.
"Foreign Office Action", EP Application No. 11818918.2, Apr. 11, 2014, 6 pages.
"Non-Final Office Action", U.S. Appl. No. 13/340,492, Oct. 3, 2014, 14 pages.
"Non-Final Office Action", U.S. Appl. No. 13/789,500, Sep. 25, 2014, 33 pages.
"Notice of Allowance", U.S. Appl. No. 13/340,508, Sep. 30, 2014, 6 pages.
"Extended European Search Report", EP Application No. 12199326.5, Apr. 3, 2013, 6 pages.
"Final Office Action", U.S. Appl. No. 13/789,500, Feb. 18, 2015, 24 pages.
"Foreign Office Action", CN Application No. 201180063604.5, Dec. 11, 2014, 16 pages.
"Foreign Office Action", CN Application No. 201210582330.7, Nov. 15, 2014, 16 pages.
"Notice of Allowance", U.S. Appl. No. 13/710,041, Dec. 8, 2014, 4 pages.
"Supplemental Notice of Allowance", U.S. Appl. No. 13/340,508, Jan. 23, 2015, 2 pages.
"Final Office Action", U.S. Appl. No. 13/340,524, Apr. 22, 2015, 12 pages.
"Foreign Office Action", CN Application No. 201180063514.6, Feb. 16, 2015, 15 pages.
"Second Written Opinion", Application No. PCT/US2014/013086, Jan. 28, 2015, 5 Pages.
"Final Office Action", U.S. Appl. No. No. 13/340,492, Jun. 19, 2015, 15 pages.
"Foreign Office Action", CN Application No. 201180063497.6, Jul. 3, 2015, 15 pages.
"Non-Final Office Action", U.S. Appl. No. 13/789,500, Jul. 9, 2015, 25 pages.
"Foreign Office Action", CN Application No. 201180063514.6, Aug. 14, 2015, 7 pages.
"Foreign Office Action", CN Application No. 201180063604.5, Sep. 24, 2015, 13 pages.
"Non-Final Office Action", U.S. Appl. No. 13/789,500, Nov. 23, 2015, 25 pages.
"Non-Final Office Action", U.S. Appl. No. 14/596,156, Nov. 20, 2015, 11 pages.
"Advisory Action", U.S. Appl. No. 14/596,156, Jul. 11, 2016, 3 pages.
"Foreign Office Action", CN Application No. 201180063497.6, Jul. 21, 2016, 11 pages.
"Foreign Office Action", EP Application No. 11802455.3, Aug. 10, 2016, 4 pages.
"Notice of Allowance", U.S. Appl. No. 14/596,156, Aug. 4, 2016, 9 pages.
"Final Office Action", U.S. Appl. No. 14/596,156, Mar. 3, 2016, 11 pages.
"Foreign Office Action", CN Application No. 201180063497.6, Mar. 4, 2016, 10 pages.
"Foreign Office Action", CN Application No. 201180063514.6, Feb. 16, 2016, 7 pages.
"Foreign Office Action", EP Application No. 11818918.2, Jan. 22, 2016, 6 pages.
"Non-Final Office Action", U.S. Appl. No. 13/340,524, Apr. 8, 2016, 13 pages.
"Notice of Allowance", U.S. Appl. No. 13/789,500, Mar. 14, 2016, 5 pages.
"Foreign Notice of Allowance", CN Application No. 201180063604.5, Apr. 6, 2016, 8 pages.
"Non-Final Office Action", U.S. Appl. No. 13/340,492, Jun. 16, 2016, 16 pages.
"Corrected Notice of Allowance", U.S. Appl. No. 14/596,156, Oct. 31, 2016, 2 pages.
"Final Office Action", U.S. Appl. No. 13/340,492, Dec. 29, 2016, 22 pages.
"Final Office Action", U.S. Appl. No. 13/340,524, Sep. 22, 2016, 13 pages.
"Foreign Office Action", CN Application No. 201180063497.6, Jan. 11, 2017, 10 pages.

\* cited by examiner

PROVIDING NOTIFICATIONS OF CALL-RELATED SERVICES

RELATED APPLICATION

This application is a continuation-in-part of and claims priority under 35 U.S.C. §120 to U.S. patent application Ser. No. 13/340,524, titled "Communication System and Method" and filed Dec. 29, 2011, which claims the benefit of U.S. Provisional Application No. 61/428,937, titled "COMMUNICATION SYSTEM AND METHOD" and filed on Dec. 31, 2010, the disclosures of which are incorporated herein by reference in their entirety.

BACKGROUND

Communication systems exist which allow a live voice and/or video call to be conducted between two or more end-user terminals over a packet-based network such as the Internet, using a packet-based protocol such as internet protocol (IP). This type of communication is sometimes referred to as "voice over IP" (VoIP) or "video over IP".

To use the communication system, each end user first installs a client application onto a memory of his or her user terminal such that the client application is arranged for execution on a processor of that terminal. To establish a call, one user (the caller) indicates a username of at least one other user (the callee) to the client application. When executed the client application can then control its respective terminal to access a database mapping usernames to IP addresses, and thus uses the indicated username to look up the IP address of the callee. The database may be implemented using either a server or a peer-to-peer (P2P) distributed database, or a combination of the two. Once the caller's client has retrieved the callee's IP address, it can then use the IP address to request establishment of a live voice and/or video stream between the caller and callee terminals via the Internet or other such packet-based network, thus establishing a call. An authentication procedure is typically also required, which may involve the user providing credentials via the client to be centrally authenticated by a server, and/or may involve the exchange of authentication certificates between the two or more users' client applications according to a P2P type authentication scheme.

Traditionally VoIP calls have been accessed using desktop or laptop computers, but increasingly nowadays the user tends to have a number of devices around the home or office that can potentially be used in VoIP calls or other such packet-based telephony. However, organizing or coordinating the use of these different devices is not necessarily straightforward for the user, or user may not even be aware when different devices are available to provide VoIP services or the like.

SUMMARY

According to embodiments disclosed herein, a notification is provided to a device within the proximity of another device. The notification may be intended for a particular device, user or type of device. The notification may serve to either announce a resource or provide a user defined message (e.g. notes or announcements). The notification may be displayed to the user when the second device is detected, or alternatively only when the user performs an action such as initiating or starting a call.

Embodiments may be carried out as follows. Firstly, it is detected that the first device is approximately co-located with a second device—this may be achieved for example by determining that the first and second devices are connected to the same network, or by other means. Then responsive to detecting that the devices are co-located, a service to the user is activated, and a notification is provided to the user that the service is available.

In one aspect the disclosure herein relates to a first near-end device being a mobile user terminal such as a mobile phone, tablet or laptop computer, operable to establish voice or video calls with one or more far-end devices over a network, e.g. VoIP calls. The first device is provided with a notification module, which in embodiments may be implemented as portions of code arranged for execution on one or more processors of the device, e.g. as part of a communication client application or otherwise.

The notification module detects when the first near-end device is within a relative proximity of a second near-end device which is available to provide a call-related service in relation to one or more of the voice or video calls. For example the detection may be made on the basis that the first and second near-end devices are both found on the same local network; e.g. same wireless local area network such as a Wi-Fi network, or same wireless ad-hoc network such as a Bluetooth network. Other options for detecting proximity are also possible, examples of which will be discussed in more detail later. As for the call-related service, in embodiments for example, this may comprise the possibility of using the second near-end device as a media end-point for one of the calls established from the first near-end terminal, so that the second near-end device plays out or generates at least one audio or video stream of the call while the first device controls the call and/or plays out one or more other audio or video streams of the same call. E.g. the second near-end device may be comprise another mobile terminal such as a phone, tablet or laptop for use as a remote microphone or camera; or a terminal such as a desktop computer, television, set-top box or stereo or hi-fi unit for use to play out the audio or video of the call. Examples of other possibilities for call-related services will also be discussed later.

Based on the detection, the notification module outputs a notification to a user of the first near-end device, notifying the user of the call-related service available from one or more other nearby devices. In embodiments the notification may prompt the user as to whether he or she wishes to accept use of the call-related service from the second near-end device (e.g. whether he or she would like to have another terminal like a tablet, TV, etc. set for use as a secondary media end-point to play out or generate the voice or video of the call).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present disclosure and to show how embodiments may be put into effect, reference will be made by way of example to the accompanying drawings in which.

DETAILED DESCRIPTION OF EMBODIMENTS

Figure 1:
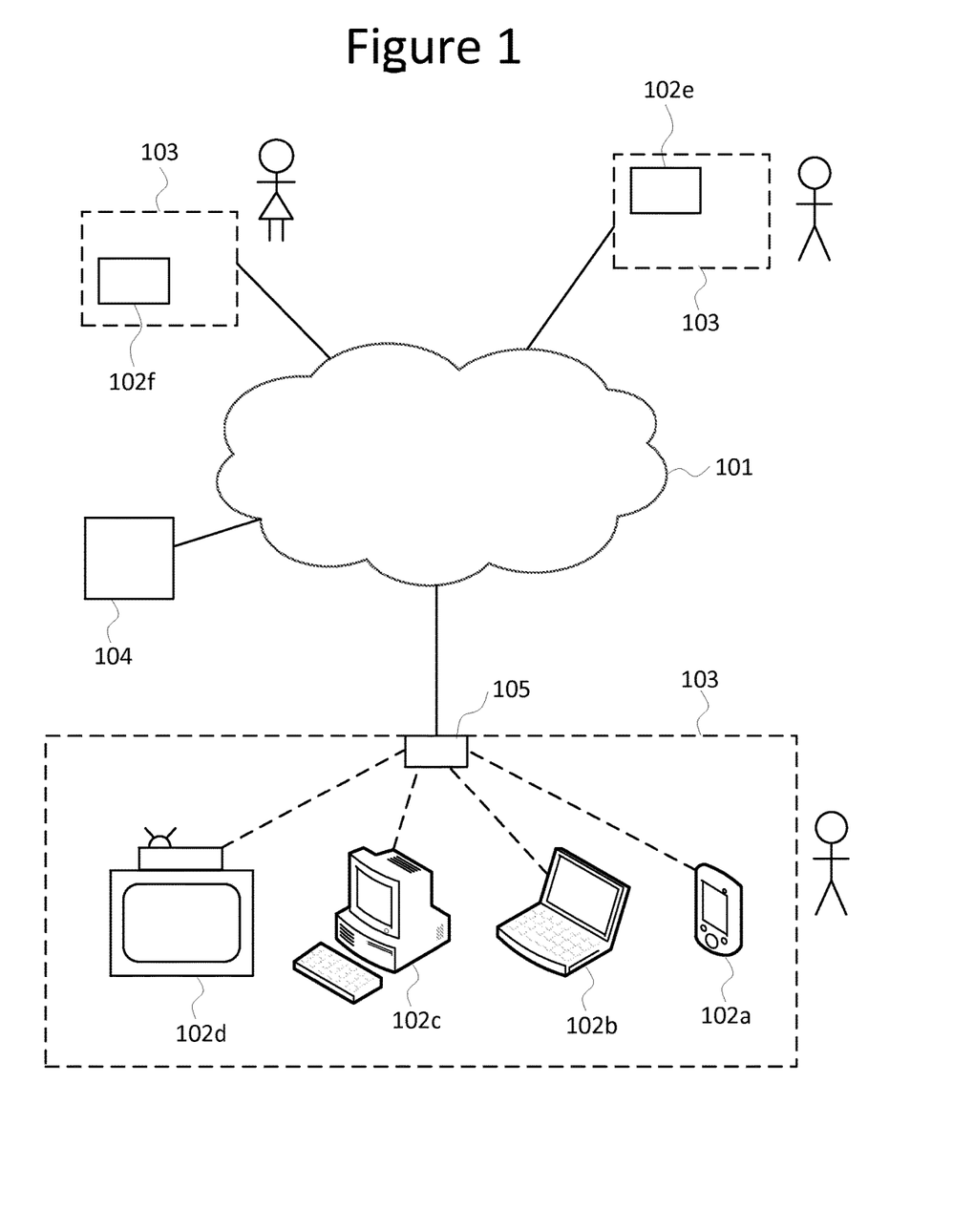
FIG. 1 is a schematic representation of a communication network.

FIG. 1 is a schematic diagram of a communication system implemented over a packet-based network such as the Internet 101. The communication system comprises respective end-user communication apparatus 103 for each of a plurality of users. The communication apparatus 103 of each user is connected to or communicable with the Internet 101 via a suitable transceiver such as a wired or wireless modem. Each communication apparatus 103 comprises at least one user terminal 102. Each terminal 102 is installed with an instance of the client application for accessing the communication system and thereby establishing a live packet-based voice or video call with the client of another user running on another such terminal 102.

Furthermore, in embodiments, the respective communication apparatus 103 of at least one user comprises an arrangement or collection of multiple terminals 102. For example, in the illustrative embodiment of FIG. 1 the communication apparatus 103 of one user comprises: a mobile handset type terminal 102a such as a mobile phone, a laptop computer 102b, a desktop computer 102c, and a television set or television with set-top box 102d. Other types of terminal 102 that may be installed with a communication client include photo frames, tablets, car audio systems, printers, home control systems, cameras, or other such household appliances or end-user devices, etc. Each of the multiple terminals 102a-102d of the same user is installed with a respective instance of the communication client application which the same user may be logged into concurrently, i.e. so the same user may be logged into multiple instances of the same client application on two or more different terminals 102a-102d simultaneously. This will be discussed in more detail below.

Each of the different end-user terminals 102a-102d of the same user may be provided with individual connections to the internet 101 and packet-based communication system, and/or some or all of those different terminals 102a-102d may connect via a common router 105 and thus form a local network such as a household network. Either way, it envisaged that in certain embodiments some or all of the different terminals 102a-102d of the same user will be located at different points around the house, e.g. with the television 102d in the living room, the desktop 102c in the study, the laptop 102b open in the kitchen, and the handheld 102a at any other location the user may happen to find themselves (e.g. garden or WC).

Also shown connected to the internet 101 is a data store 104 in the form of either a server, a distributed peer-to-peer database, or a combination of the two. A peer-to-peer database is distributed amongst a plurality of end-user terminals of a plurality of different users, typically including one or more users who are not actually participants of the call. However, this is not the only option and a central server can be used as an alternative or in addition. Either way, the data store 104 is connected so as to be accessible via the internet 101 to each of the client applications or instances of client applications running on each of the terminals 102 of each user's communication apparatus 103. The data store 104 is arranged to provide a mapping of usernames to IP addresses (or other such network addresses) so as to allow the client applications of different users to establish communication channels with one another over the Internet 101 (or other packet-based network) for the purpose of establishing voice or video calls, or indeed other types of communication such as instant messaging (IM) or voicemail.

In the case where the same user can be simultaneously logged in to multiple instances of the same client application on different terminals 102a-102d, in embodiments the data store 104 may be arranged to map the same username (user ID) to all of those multiple instances but also to map a separate sub-identifier (sub-ID) to each particular individual instance. Thus the communication system is capable of distinguishing between the different instances whilst still maintaining a consistent identity for the user within the communication system.

Figure 2:
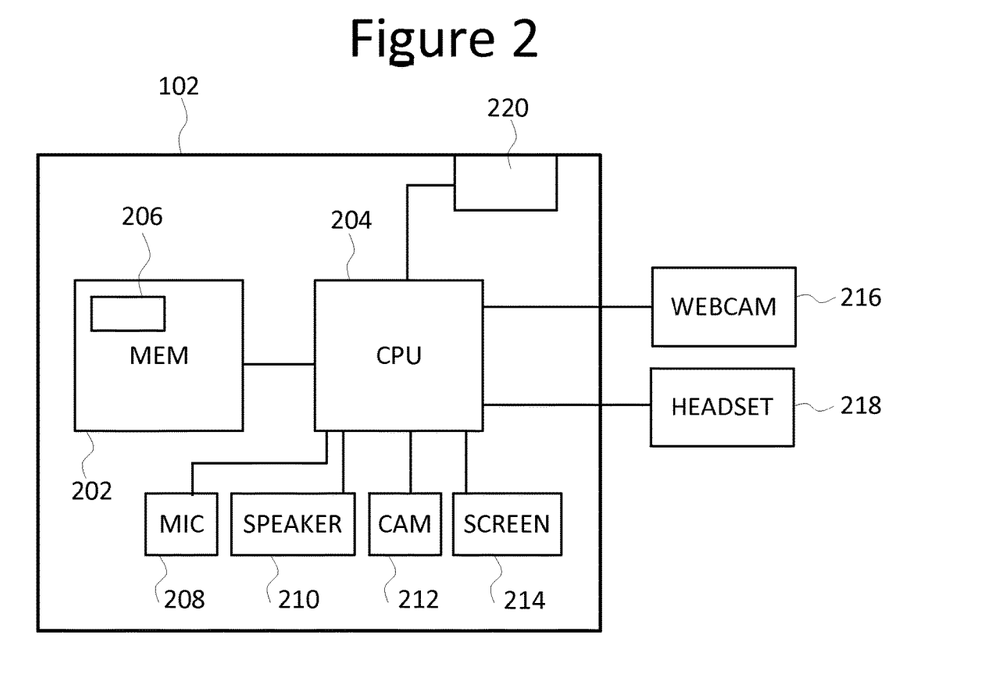
FIG. 2 is a schematic block diagram of a user terminal.
Figure 3:
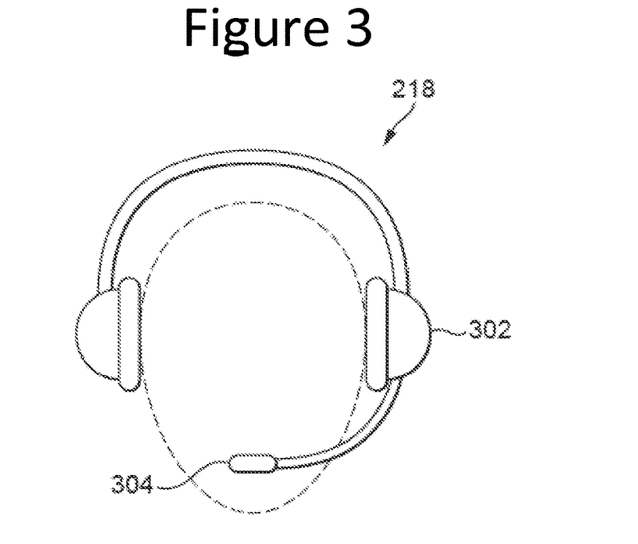
FIG. 3 is a schematic illustration of a headset.

FIG. 2 shows a schematic block diagram of an exemplary end-user terminal 102 according to embodiments, which may correspond to any of those mentioned above. The user terminal 102 comprises a memory 202 such as an internal or external hard drive or flash memory, and a processing apparatus 204 in the form of a single or multi core processor. The memory 202 is installed with an instance of the communication client 206, is coupled to the processing apparatus 204, and is arranged such that the communication client 206 can be executed on the processing apparatus 204. The terminal 102 also comprises a transceiver 220 for communicating data on the up and downlink to and from the client 206 via the Internet 101 or other such packet-based network, e.g. a wireless transceiver for wirelessly connecting to the Internet 101 via the wireless router 105. The terminal 102 further comprises one or more AV transducers e.g. an internal microphone 104, an internal speaker 210, an internal camera 212 and a screen 214. The terminal 102 may then also comprise one or more further AV transducers plugged into the main body of the terminal 102, e.g. an external or peripheral webcam 216 and a headset 218. As shown in FIG. 3 the headset 218 may comprise an earpiece or headphones 302 and microphone 304 integrated into the same unit.

The term AV transducer may be used herein to refer to any means of audio or video input or output. Terminal is meant as a discrete unit of user equipment whereas a transducer is a component or peripheral of a given terminal.

Each of the transducers 208-218 is operatively coupled to the processing apparatus 204 such that the client is able to receive input from any or all of the input transducers 208, 212, 216, 218 and supply outputs to any or all of the output transducers 210, 214, 218. In embodiments the terminal of FIG. 2 therefore comprises multiple audio input transducers, multiple audio output transducers and/or multiple video input transducers, and each of these is potentially available to the client application 206 for conducting voice or video calls over the packet-based network. Multiple video output transducers are also a possibility.

According to a first embodiment, the client application 206 is configured so as when executed to receive an input from multiple different input transducers of the same terminal 102, to analyse the input signals from the different input transducers in relation to one another, and based on the analysis to select a suitable input transducer and/or output transducer of that terminal for use in conducting a call.

According to a second embodiment, the instances of the client application 206 on the different terminals 102a-102d of the same user are configured so as when executed to operate in conjunction with one another, to thereby receive an input from input transducers of the different terminals 102a-102d, analyse the input signals from the different terminals 102a-102d in relation to one another, and select a suitable one of the multiple instances of the client application 206 running on different terminals 102a-102d for use in conducting a call. That is to say, the second embodiment is concerned not just with the selection of a particular input or output transducer 208-218, but also with the routing of the voice and/or video stream of a call to and from a selected terminal 102a-102d. In this case the terminals 102a-102d together form one end of a call (the "near end") communicating with the client running on a further, third user terminal 102f (the "far end") via the Internet 101 or other such packet-based network.

In either case, the analysis applied to the inputs may include:
- a comparison of the energy or power level of the received audio signal from two or more audio input transducers from the same terminal 102 and/or from different terminals 102;
- comparison of a Fourier analysis of the input signal received from two or more different audio or video inputs from the same terminal and/or different terminals;
- a voice recognition algorithm applied to the received audio signal from two or more audio input transducers from the same terminal 102 and/or from different terminals 102;
- a facial recognition algorithm applied to the received video signal from two or more video input transducers from the same terminal 102 and/or from different terminals 102; and/or
- a motion recognition algorithm applied to the received video signal from two or more video input transducers from the same terminal 102 and/or from different terminals 102.

The client application 206 is arranged to perform one or more such analysis processes and, based on the said analysis, to select one or more of the following for use in conducting the packet-based voice or video call: an input audio transducer, an input video transducer, an output audio transducer, an output video transducer, and/or an instance of the client application running on one of multiple terminals of the same user. This process may be performed upon making a call, answering a call, and/or dynamically during an ongoing call.

For example, in one application is in conjunction with a client 206 or terminal 102 capable of recognising voice activated commands, e.g. so that the user can control the client 206 vocally with commands such as "call . . . ", "answer call", and "hang up". Depending on the approximate location of a user within a room, or depending on whether or not the user is wearing his or her headset 218, then the optimal microphone for use in making or answering a call may vary. The client 206 may therefore analyse the inputs from two or more microphones 208, 304 of the same terminal in the same room to determine which input signal has the largest energy in the human vocal frequency range, e.g. when the user speaks to answer the call using a voice command, and then select that microphone to use in the call.

The audio inputs from the microphones may also determine a suitable audio output transducer, e.g. by selecting between a loudspeaker 210 and the headphones 302 of a headset 218 depending on which microphone is generating the most vocal energy.

In another example, detection of a rustling or scrabbling sound at the headset microphone 304 may be taken as indicative of the user fumbling for their headset to answer an incoming call, and this can be used to select the headset 218 for audio input and/or output.

In yet another embodiment, the audio inputs from the microphones may be used to switch between different audio or video output transducers during the call, e.g. if the user moves around the room or puts on or removes the headset In an example of the second embodiment, the user has different terminals 102a, 102b, etc. located in different places around the house. In this case an analysis of the energy levels from different microphones or cameras of different terminals may be used to determine the presence of the user in a particular room or the proximity to a particular terminal, and hence determine the best terminal for answering or making a call, or to switch between the terminals during an ongoing call as the user roams about the house. Other techniques that can be used to detect the presence or proximity of a particular user include motion estimation to detect the presence of a suitably sized moving object (which may be taken as a human moving between rooms), a Fourier analysis to determine an overall colour property of an image or moving object (e.g. based on the assumption that the moving user wears the same colour clothes as they move between rooms), or a voice or facial recognition algorithm (to help distinguish between multiple people and/or background noise), or indeed any combination of these.

In the case of the second embodiment, the client instance 206 on at least one of the terminals will send information about the input received from its respective transducer(s) to one or more other terminals or other network elements for comparison. To achieve this, both (or all) of the user's client instances 206 that are involved in the comparison may be logged in to with the same username and have the concept of being in the same call.

For example, communication between the instances and/or controller may be enabled by reference to the system of user IDs and sub-IDs mapped to IP addresses or other such network addresses by the data store 104. Thus the list of sub-IDs for each user allows the different client instances to be identified, and the mapping allows a client instance, server or other network element to determine the address of each terminal on which one or more other different instances is running. In this manner it is possible to establish communications between one client and another or between the client and a server or other network element for the purpose of sharing information on the input signals from the audio and/or video input transducers, e.g. to share input energy levels, motion vectors or FFT results. The same mechanism may also be used to signal or negotiate the selection of the required instance for conducting the call.

Alternatively, communication set up may be enabled by maintaining a list of only the terminal identities rather than the corresponding client identities, the list being maintained on an accessible network element for the purpose of address look-up. For example a list of all the different terminals 102a-102d may be maintained on an element of the local home network, 105, 102a-102d, in which case only the local network addresses and terminal identities need be maintained in the list, and a system of IDs and separate sub-IDs would then not necessarily be required. The local list could be stored at each terminal 102a-102d or on a local server of the home network (not shown), and each client instance would be arranged to determine the necessary identities and addresses of the other instances' terminals by accessing the list over the local network.

Once a suitable mechanism has been put in place for identifying the different client instances and the addresses of their respective terminals 102a-102d, the selection may be performed in a number of ways. For example, in one implementation all of the client instances 206 in question may be arranged to transmit their respective transducer input information (e.g. input energy levels, motion vectors or an FFT result) to a central server or other central control element, which could be implemented on a server along with the data store 104 or on an element of the local home network. The central controller would then be arranged to run an algorithm to analyse the different received inputs in relation to one another and thereby select the instance of a particular terminal, e.g. 102*b*, to make or answer the call. The controller then instructs the instances 206 on their behaviour (are they involved in the call or not and to what extent) using the chosen signalling mechanism. In another implementation, the different client instances 206 may share the information directly between each other and either mutually negotiate the selected terminal according to some predetermined protocol or act under the control of one instance that has been designated as the master instance (e.g. by the user or by default).

As mentioned, in some embodiments the analysis of the transducer inputs may be used to switch between different instances of the client 206 running on different terminals 102*a*, 102*b* of the same user during an ongoing call, e.g. as the user walks between rooms (rather than just selecting an instance to initiate an outgoing call or answer an incoming call). This may involve each client instance 206 periodically sampling or otherwise monitoring its respective input transducer or transducers 208, 212, 218 and sharing the monitored information throughout the call in a similar manner to that described above. Alternatively each client may only share new transducer input information in response to some detected event such as the input energy level or motion vector exceeding some threshold. Either way, the controller or master instance may thus apply the selection algorithm to the received input information at multiple times throughout the call, in either a scheduled or event-based manner, in order to make an ongoing, dynamic selection as to which instance 206 on which terminal 102 should be used for the call.

In one implementation of the dynamic switching case, once the desired instance has been identified as the selected endpoint for the call, then the switchover may be completed in a similar manner to known call forwarding techniques, but with the call being transferred between different terminals of the same user based on different sub-IDs, rather than the call being transferred between different users based on different user IDs. In another implementation, the client 206 on the initial terminal, e.g. 102*b*, may continue to receive the audio and/or video stream of the call but then route the audio and/or video stream onwards to the newly selected terminal, e.g. 102*c* (such that the endpoint of the call appears to be the same, 102*b*, from the perspective of the client on the other end of the call). This latter option would be particularly applicable if the initial and new terminals 102*b* and 102*c* have a local wireless connection such as a wi-fi or Bluetooth connection available between them.

In both the first and second embodiments, note that the type of transducer being selected is not necessarily the same as the type of transducer used to make the selection. E.g. a microphone may indicate the presence of a user in a particular room or location and be used to select a suitably located camera, or a camera may indicate the presence of a user in a particular room or location and be used to select a suitably located microphone, etc.

Further, it is not necessarily the case that the voice and video streams are routed to and from the same user terminals 102*a*, 120*b*, etc. In embodiments it could be possible to determine that, say, a television 102*d* is best placed to display video to the user whilst a laptop 102*b* or mobile terminal 102*a* is best placed to handle the audio part of the call. The selection algorithm running on the client instance 206 and/or central controller would then instruct the two streams to be routed to different terminals 102*a*, 102*b*.

The first and second embodiments may be used either independently or in combination. For example, it would be possible for the instance of the client application 206 running on each of multiple terminals 102 to determine its own best local input transducer (e.g. highest audio input energy level or best Fourier analysis match), then for the different instances to compare their best local input results to find the best global input result.

In either case, an initial calibration phase may be useful, e.g. to determine the relative levels that the different microphones generate when the user is at different distance from those microphones. That is to say, the client 206 may be configured to determine the relative gains of the different microphones. For example upon initial installation the user may be asked to sit or stand at two or more predetermined distances from the terminal and speak at a fixed level, which the client 206 can then use for calibration.

In absence of a clear determination in any of the above examples, the client or system may be configured to use a default transducer and/or terminal for making or answering calls.

According to a third embodiment, a primary terminal 102 running an instance of the communication client 206 is able to select the resources of one or more secondary terminals 102 installed with or running another instance of the client 206 to be used during a conversation. The user may use the terminal 102 that provides the best interfaces for what they are doing. For example if the user is participating in a video call, he may use his TV 102*d* for receiving and transmitting video, while using a mobile device 102*a* for controlling the call and transmitting and receiving the audio stream. Similarly if he wanted to maintain a conversation while working in his living room he may direct the call to a stereo system or speaker phone while he sends/receives video from a handheld or portable device like a photo-frame, he may even chose to send/receive a data file going directly from/to his NAS (network attached storage device). Alternatively he may direct all media to the secondary terminal but just retain control of the call from the primary terminal. Either way, the control of the call may comprise for example initiating a call, changing options within a call such as volume, toggling the use of the secondary terminal in the call on or off, selecting between secondary terminals for use in the call, or terminating a call ("hanging up").

The term "consume" may be used generally to mean playing a live audio or video stream or storing a file transfer, i.e. using the stream for its ultimate purpose at its end-point destination. Similarly the term "generate" may refer to capturing a live audio or video stream or retrieving a file transfer from memory for transmission over a network, i.e. at the origin of the stream. The third aspect can be used to allow the second terminal to consume or generate at least one stream of the call whilst the first user terminal concurrently generates or consumes at least another stream of the call. The different terminals handle the different streams exclusively of one another, e.g. generating or capturing video only at the secondary terminal and not the primary terminal whilst generating or capturing audio only at the primary terminal and not the secondary terminal, or other such combinations. In alternative embodiments one of the streams may be a file transfer performed in conjunction with the voice or video call as part of the same session between the same near and far end users. In other embodiments only live voice and/or video streams may be involved, e.g. with one terminal capturing the outgoing video stream and another terminal playing the incoming video stream, and/or with different terminals handling audio and video streams.

In one example, the client instances may be "network aware" and may be provided with an API enabled to facilitate not only the discovery of the different devices but also the easy usage of different media streams in a conversation from one end point to the next or the combination of two end points. This allows a user to configure how multi device resources should be allocated for handling communication events.

In embodiments the client application running on a user terminal 102 is configured to determine an availability of one or more other, second user terminals installed with other instances of the client application. That is to say, does not just detect the existence of a particular kind of physical device or link, but rather the client is configured to detect the existence of other instances of the same communication client installed on other user terminals 102 (whether an identical instance or an instance of a compatible version of the communication client). E.g. the client does not just detect a wi-fi or Bluetooth device but also detects that the device has a suitable instance of a communication client. Thus the clients are able to detect one another on the network, e.g. by announcing themselves over a network such as the local network 103 or wider network 101. Example details of some suitable discovery mechanisms will be described later.

This third embodiment allows a user to be presented with a list of available user terminals 102 and to select at least one secondary terminal 102 with the most appropriate capabilities to handle part of the call or a particular type of communication, for example a live video stream or file transfer. According to an embodiment of the invention, a terminal 102 such as a mobile phone 102a installed with an instance of the client application 206 is arranged to discover other resources that are available on other such user terminals 102. The primary user terminal may detect proximity of the one or more potential secondary terminals based the existence of one or more other instance of the client operating within the same network, e.g. same local network such as a wireless home network 103. The user may then select to use the resources of one or more of the discovered terminals 102.

The selection of "resources" may refer to selecting a particular other (secondary) user terminal 102, or selecting a particular audio or video output transducer 208-218 of a particular other user terminal 102.

The terminal 102 that is used by a user to perform the selection will be referred to as a primary terminal. Each selected terminal will be referred to as a secondary terminal. In the case of an outgoing call the primary terminal is the initiator of a call, and in the case of an incoming call the primary terminal is the terminal used to answer the call. The primary terminal is also the terminal which controls the call, e.g. to choose when to terminate the call or activate other features. The primary terminal may remain the master terminal for the purpose of controlling the call, or primary status could be transferred during the call to another terminal such as one of the secondary terminals.

A similar terminology may be used to describe the primary and secondary clients running on the primary and secondary terminals respectively.

According to the third embodiment, the client 206 on the other (secondary) user terminal such as 102c may be of the same user as that on the primary terminal (i.e. logged in with the same user ID), or may be another terminal 102e borrowed from a different user (logged in with a different user ID). Either way, the primary and secondary terminals 102a-102e together form one end of the call (the "near end") communicating with the client running on a further, third user terminal 102f (the "far end") via the Internet 101 or other such packet-based network.

In order for one client instance 206 to use the resources of another client instance 206 it may be desirable that the primary client instance be authorised to use the resources of the other client instance. There are different methods by which one client instance 206 can authorise another client instance, as follows.

One method is for instances of the client 206 that are logged on with the same username may be automatically authorised to share resources, e.g. the clients on terminals 102b and 102a.

In another authorisation method, if the terminals 102 are logged on using different usernames, it may be necessary for the client on one terminal such as 102b to authorise the client of another terminal 102e to use resources. This may be configured locally at the terminal 102, for example the user may input the usernames of authorised clients 206, or select contacts from the contact list that are authorised to use the terminal resources. Alternatively this may be configured remotely, for example a primary client may send an authorisation request to a secondary client to allow the primary client to use the resources of the secondary client.

Alternatively a client 206 may be configured to authorise any contact to use the resources of the terminal 102—i.e. any contact that has been approved by the user to be included in a contact list.

In another alternative, the client 206 on the primary terminal 102b generates a PIN code which the user must then enter into the client 206 on the secondary terminal 102a or 102e. The client on the secondary terminal 102a or 102e then transmits the PIN back to the client on the primary terminal 102b and, on condition that the PIN is correct (matches), the client on the primary terminal then authorises the secondary terminal.

As such the primary terminal 102b that initiates a VoIP conversation will have the capability to direct any media stream to any of the secondary terminal that is authorized to use. The media stream of the conversation will be directed to the designated secondary terminal 102e that the primary user selects. The primary user may choose to move all the media streams to a terminal and/or designate an alternative terminal as the primary terminal.

Each client 206 that can act as a primary client, e.g. on primary terminal 102b, is configured with a mechanism for resource discovery for discovering the presence of other potential secondary terminals 102a, 102e, etc. and/or for discovering the media capability of the potential secondary terminals (what input and output transducers they have available). E.g. this may be achieved by detecting which other terminals are connected to the same local network and installed with an instance of the client. Resources available to the primary client are then presented in a list. The list of available resources may indicate the terminal type (e.g. TV, printer) such that the user can select the most appropriate device to handle the communication event. For example the user may select a TV for a video call, a stereo system for a voice call, or a Network Attached Storage (NAS) device for a file transfer.

The available resources of other terminals installed with instances of the client 206 may be discovered using a number of alternative methods, for example as follows. A user terminal 102 installed with a suitable client application 206 or suitable instance of the client application may be referred to in the following as an "enabled terminal".

One such method is server assisted resource discovery. For example a server stores the location of each terminal having an instance of the client 206. When a user logs in, the client is arranged to provide its location and terminal type/capabilities to the server. The location could be defined as IP address, NAT or postal address input by the user. In this embodiment of the invention the server is arranged to return a list of proximate terminals to that of the primary client in response to the primary client transmitting a find suitable terminals to the server.

Alternatively the server may provide a client 206 with a list of available terminals 102 enabled with the client 206 in response to receiving a configuration message from a client 206. In this case a client may provide a list of one or more usernames that are authorised to use the resources of the device on which the client is installed. The user of the device may configure access to be limited to certain types of resource, e.g. audio output only, and may additionally control the times during which the resource may be accessed. The server is arranged to provide each authorised client in the list with a message indicating which resources the client is authorised to use and when.

In either of the above options the server could instead be replaced with a distributed database for maintaining the list, or a combination of the two may be used. In the case where the primary and secondary terminals are of the same user, i.e. running clients logged in with the same username, the system of usernames and sub-identifiers may be used to distinguish between the different instances in a similar manner to that discussed above. However, that is not essential and instead other means of listing the available terminals could be used, e.g. by listing only the terminal identity rather than the corresponding client identity, or in the case where the primary and secondary terminals are of different users (e.g. 102b and 102e) then the sub-identifier would not necessarily be needed.

Another possible method is common local network device discovery. In such an example, the primary client is arranged to present a list of terminals 102a, 102c, 102d enabled with the client 206 to the user that are discovered on the local network, this may be in response to the user actuating a find 'Enabled Terminals' instruction or in response to the user connecting to the network. Any IP enabled terminal that registers into a given network receives a unique IP address within that network. As an enabled terminal joins it will broadcast a presence message to all enabled terminals in that network announcing a given username/ID and a list of authorized users that have rights to access its capabilities. All the enabled terminals 102 that receive this message and have a common authorized user will reply back to authenticate themselves and establish a secure communication channel through which they will announce its IP address and available resources to the primary user. The primary user will have rights to access the media interfaces of all the enabled terminals for which it has been authenticated.

Another method is to select resources from the contact list (i.e. a list of contacts approved by the user for communicating with that user, typically maintained via the user's own client 206). In this case resources of other terminals such as 102e may be indicted on the user's contact list. For example each contact listed in the contact list will indicate the type of terminal 102 on which the client is executed. This may be determined automatically, for example the client 206 may detect the type of device by detection of the operating system. Alternatively the user may input the device type directly. The device type may be presented in the contact list in the form of the contact name, 'John's TV', the mood messages, or an icon.

In both the second as well as the third embodiments, the online status of the other or secondary client application may be relevant, e.g. on other user terminal 102a, 102c or 102e.

In order for the resources of another or secondary terminal 102 to be accessed, this may be conditional on the device being online at the time the communication event is received. If the secondary terminal is not online the primary client may be prevented from selecting the resources of the offline secondary device.

The availability of resources may be determined using the presence. In this case the client applications 206 are arranged to search for contacts' network addresses in a peer-to-peer network or server. Once the address is determined the client 206 sends a status request command to the specified address. If the contact is online, it responds with a reply reporting its status. If no reply is received, the contact is deemed to be offline. Presence requests may be sent periodically so that the status can be updated.

In an alternative, in the case where the secondary terminals 102 are located on the same local network, each client 206 is arranged to transmit "keep alive" messages periodically. If a keep alive message is not received from a client, the client is determined to be offline.

A further matter which may be relevant to the third embodiment is the primary and secondary client status.

When a client is selected as a secondary client, the identity of the primary client is stored at the secondary device. The client will behave as a secondary client for any calls or communication events associated with the primary client.

For example, in response to receiving a selection request at the secondary terminal, the secondary client will store the network location/username of the primary terminal. The secondary client will handle media and call set up instructions from the primary client in accordance with predetermined rules configurable by the user. For example the user may configure the TV client to allow the mobile client to use the video input and output resources of the TV. If the TV receives a call set up request from a third party that identifies the mobile client as the primary client, the TV will only handle the video media during the call. In particular the TV client will not attempt to capture and transmit audio during the call. Furthermore the TV will not display a user interface to the user for controlling the call.

The above provides example mechanisms by which one or more user terminals can be selected for use in conducting a call or part of a call according to the second or third embodiments of the invention. Once a suitable mechanism is put in place, call or communication set up can proceed as follows. By way of example, the following will be described with reference to the laptop or tablet style computer 102b as the primary terminal and the mobile handset type terminal 102a as the secondary terminal.

When a call is received at the primary terminal 102b, the client running on the primary client may be used to answer the call and direct the media stream to the desired selected secondary terminal 102a. Note that the audio and video streams of a video call are not necessarily generated or played out by the same user terminal 102, and nor are the received and outbound streams necessarily generated and played by the same terminal 102. Indeed, in one use case the primary terminal 102b can be used to generate and/or play out the audio stream whilst the secondary terminal 102a is used to generate and/or play out the video stream, or vice versa—i.e. the second terminal 102a handles whichever of the received and/or outbound audio and/or video streams is not handled by the primary terminal 102b. Other streams such as file transfers forming part of the same session as the call may also be directed to a secondary terminal, e.g. 102c or 102e.

In embodiments, the primary client on the primary terminal 102b may instruct the far end party (on the other end of the call) to route the relevant media stream directly to the secondary client on the secondary terminal 102a (e.g. by referring the far end terminal to the mapping of user IDs and Sub-IDs to addresses in the data store 104, or by sending the address of the secondary terminal 102a to the far end terminal directly). Alternatively however all streams may be routed via the primary terminal 102b, with the primary client then routing any required streams onwards to and from the secondary terminal 102a (i.e. so from the perspective of the far end client and user terminal the primary terminal 102b is still the end point for all streams of the call, and the routing to or from the secondary terminal is handled solely by the client on the primary terminal 102b).

In order to retain control of the call at the primary device, the secondary client will handle the call in response to instructions received from the primary client (e.g. end call). In one example these instructions may be sent as IM messages. The primary terminal may input call handling instructions such as 'increase volume', 'answer call', 'turn off webcam' or 'end call' using predetermined IM messages, recognised by the secondary client.

In an alternative, call set up may be handled by the server. For example if the user has previously configured the system to send video to the television, the server will provide the address of the TV to the far end node such that video data can be sent directly to the TV client. Again the TV client will be aware that the call is associated with the primary device and will accordingly only use the resources that are authorised for use.

Either way, in order to direct control signals to instruct the secondary terminal, the primary client or the server may determine the address of the secondary terminal from a list or database mapping addresses to terminal identities or user IDs and Sub-IDs, which may be implemented on a server, distributed database or local network element. In embodiments the mechanism for transmitting control signals and/or responses in the third embodiment may be the same or a similar mechanism to that used to share information on transducer inputs according to the second embodiment, or in other embodiments different mechanisms may be used for the two different aspects.

Note that in embodiments a client 206 installed at any terminal 102 may present the user with a list of enabled terminals 102 which are installed with an instance of the client application 206. In this case the terminal on which the user selects a terminal becomes the primary terminal and the selected terminal becomes the secondary device.

The behaviour of a client 206 as either a primary client or a secondary client will depend on whether it has been selected for use as a secondary client.

An example use of the third embodiment is now described with reference to FIG. 4. This advantageously adds the option of a remote camera as a feature of a VoIP video call, allowing a user to use his or her mobile terminal 102a as an 'off-board' camera. While in a video call on a device such as a TV, desktop computer or similar, the user will have the ability to switch to using their mobile phone's camera to move around their environment and show the person they are calling their surroundings. This functionality can also bring video calling capability to users' who do not have a web cam connected to their computer/laptop 102b etc.

Figure 4:
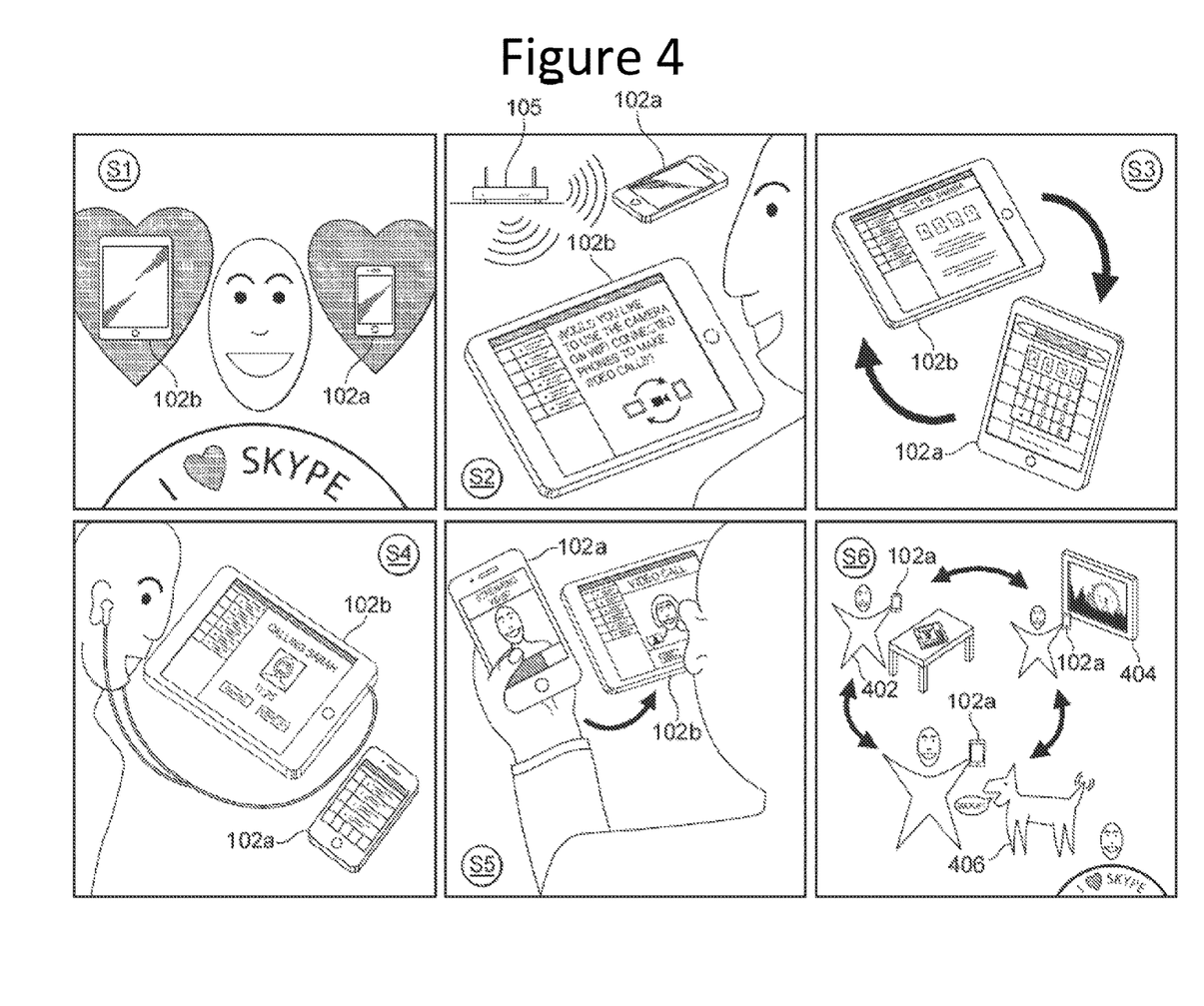
FIG. 4 illustrates a method according to one embodiment.

Referring to FIG. 4, at step S1 a user "Dave" begins with a user apparatus 103 comprising a laptop or tablet type computer 102b and a mobile handset type terminal 102a, each installed with an instance of a VoIP client 206 for performing voice and video calls. As shown under step S2, both devices are connected to a wireless home network via a suitable transceiver 220 and wireless router 105, e.g. wi-fi.

In this example Dave has selected the tablet computer 102b as his primary terminal. At step S2 the client 206 running on the primary terminal 102b detects the presence of a potential secondary terminal 102a on the local network (in this case a mobile terminal 102a) and prompts him with an on-screen message asking whether he would like to link the devices so as to use the camera on his mobile terminal 102a to capture video for the purpose of video calls (alternatively Dave may summon this option himself). For the sake of example, Dave chooses "yes".

At step S3 the client 206 on the primary terminal initiates an authorisation procedure to authorise the mobile 102a for use as a secondary terminal. In the illustrated example the authorisation procedure used comprises the PIN code method mentioned above, whereby the client on the primary terminal 102b generates a PIN code which the user then enters into the client 206 on the secondary terminal 102a or 102e, and the client on the secondary terminal 102a or 102e then transmits the PIN back to the client on the primary terminal 102b to demonstrate that it matches and thereby obtain the required authorisation. However, in other embodiments other authorisation techniques could be used, either as an alternative or in conjunction with the PIN code method.

At step S4, Dave answers an incoming video call or initiates an outgoing video call with a remoter user "Sarah" using the primary terminal 102b. At this stage the client 206 on the primary terminal 102b may prompt him again to check he would like to use the secondary terminal to capture video in this particular call (or possibly other options such as using a TV 102c to play out video, or use the mobile terminal 102a to capture voice, etc.) Again for the sake of the example, in this case Dave selects "yes".

At step S5 the call begins. This includes the client on the secondary terminal 102a streaming the captured video via the local wireless network or other wireless connection network to the primary terminal 102b, whilst the primary terminal 102b captures the audio signal. The incoming audio and video streams are received at the client on the primary terminal 102b, and in this example also played out from the primary terminal 102b. However, other divisions between the primary and secondary terminals of the functions of capturing and/or playing out of the audio and/or video streams are also possible. Other routing options are also possible, e.g. by the example discussed above whereby the client on the primary terminal 102b instructs the remote user's terminal 102 to set up a separate channel with the secondary terminal so as to route one of the streams directly to or from the secondary terminal 102a in parallel with the primary terminal 102b.

As shown at step S6, using the described set up, Dave can then direct the camera on his mobile terminal 102a so as to share video with Sally, e.g. of himself 402, his surroundings 404 or his pet dog "Toby" 406.

Another example is now discussed. In this example, the availability of another nearby device as a resource is detected while the user is currently on a call using his or her first device, and the notification that the device is available is presented to the user dynamically on the first device while on the call. That is, the notification is presented immediately at the time the second device is detected, in response to the detection. The notification may take the form of an icon displayed on the user's first terminal, e.g. in the call window, which the user can click on to immediately "throw" the call or at least one of the call media (incoming or outgoing audio or video). In embodiments, this is done in response to only a single click of the icon. In embodiments, the icon is a graphical representation of the type of the second device, e.g. small graphic of a TV set. The icon or other notification thus provides a selectable user input that appears immediately, while in a call, each time one or more potential resources are detected. This provides an intuitive way for the user to make use of nearby resources, in embodiments requiring only a single click to transfer a call or part of a call to another nearby device.

For instance, the communication client runs on a companion (first) device such as a laptop, smartphone or tablet. The companion device is aware of local addressable large display screens which can be used to show the media from an active call. The user is able to simply switch the incoming AV from being displayed on the companion device to being displayed on the TV. The user's own outgoing audio and video are captured locally on the companion device on and the companion device does all processing of the call.

In an example scenario, Simon often travels overseas for work and uses VoIP to keep in contact with his wife and young son. He is staying in the Westin in Palo Alto and sees they have just updated their in-room TVs to the latest range from a leading brand. From his hotel room, he makes a VoIP video call from his laptop to a tablet computer back at home. His wife carries their tablet around the house so Simon can say goodnight to his one year old son, Tom, and can be part of the bed and bath-time routine. In the hotel, the TV is on quietly in the background and during the call a new TV icon appears in the call window on the laptop. Intrigued, Simon hits the icon and is surprised to see Tom full screen on the TV. It's great to see Tom full size, the sound of him splashing around in the bath can be heard through the TV speakers. Simon's outgoing video isn't very important as his wife is dealing with Tom, but it's great to have a 'window' into the house to see what's going on.

In embodiments:
- the companion device's sensing functionality may be available on all or at leats all major smartphone platforms, tablet platforms and desktop platforms (i.e. all operating systems);
- the companion device may be automatically aware of the local presence of a compatible display device;
- the display device may operate in either an 'open' state, i.e. any capable device can connect to it without impediment, or 'closed' state where the TV must authorise access to the device (e.g. based on a one time authorisation);
- the user may be able to answer and initiate calls on the companion device in the usual way;
- where one or more display devices are in range, the companion device may display an option in the UI that indicates to the user that an alternative device is available and to allow the user to select it to display the current call;
- both the far-end video and voice may be output from the display device together with the near-end preview;
- the companion device may capture near end audio and video;
- mirroring may support video display on the TV at resolutions of up to HD at 720 (30 fps) and audio at wideband quality, and generally the solution may meet cert spec;
- the display device may be able to respond seamlessly to any ad-hoc changes to video/audio bitrate or framerate during a call;
- the user may be able to start/stop his or her video, and mute/unmute his or her audio during a call when mirroring is taking place;
- the user may be able to stop mirroring the call on the TV and return to using the companion device only for viewing the call;
- the companion device may be able to present a different local view of the VoIP client while maintaining mirroring of the call, e.g. the user can react to incoming IM messages while the call is ongoing; and/or
- in devices that support multi-tasking, it may be possible for the companion device to continue processing and mirroring the call while presenting a different 'view' to the near end user—this allows the user to use other apps while the current call is being mirrored.

In embodiments, such features may:
- remove cost-barriers to using a TV as a display device for Skype—no camera purchase needed;
- limit time barriers to call activation no data entry or navigation;
- provide anonymity, e.g. the TV is never 'signed in' and can be used in hotels, at someone else house etc.;
- not interfere with TV functions such as PVR capabilities (as no processing on TV);

The scope of the disclosure herein is not limited to selecting resources based on an analysis of AV transducer inputs, or detecting which transducer or which terminal's transducer the user is closest to. As discussed above, a user is provided with a message indicating that another potential resource in the form of another near-end device is discovered to be within a suitable proximity of the user's current device. Generally, proximity can be detected based on the two devices being connected to the same local network (e.g. same home or local WLAN), and/or based on other means such as a geographic localization technology, a property relating to intermediate network equipment (e.g. round trip time or number of hops), or a property of an environment in which the two devices are found (e.g. an environmental sound). Further, such techniques may be used to provide a user with a notification of any call-related service detected to be in the proximity.

Hence according to embodiments disclosed herein, a notification is provided to a device within the proximity of another device. The notification may be intended for a particular device, user or type of device. The notification may serve to either announce a resource or provide a user defined message (e.g. notes or announcements). The notification may be displayed to the user when the second device is detected, or alternatively only when the user performs an action such as initiating or starting a call.

Embodiments may be carried out as follows: 1) detect that the first device is co-located with a second device—this may be achieved for example by determining that the first and second devices are connected to the same network, or by other means such as those discussed in more detail below; and 2) responsive to detecting that the devices are co-located, activating a service to the user and optionally providing a notification to the user that the service is available.

The teachings disclosed herein may be implemented in a number of scenarios, for example:
- a mobile computing and/or communication device (e.g. phone) may be offered access to a service provided by a TV or games console, such as an offer of consuming the larger, more appropriate screen to render incoming video;
- a mobile computing device might offer its local/mobile services such as audio capture to a fixed device (e.g. to use the mobile device as a remote microphone); or
- an anchor device such as an ATA (analogue telephone adaptor) might offer access to a locally available service (such as incoming phone calls rendered at the ATA).

Referring back to FIG. 1, in embodiments the near-end network 103, 105 may form any short-range network such as a wireless local area network (WLAN) or wireless personal area network (WPAN). Its wireless network equipment 105 may comprise one or more wireless access points such as a wi-fi access point (e.g. providing coverage within a café, bar, shop, mall or other retail complex, or railway or bus station, airport or other transport hub); or a wireless router providing coverage in the home (e.g. covering a single home or an apartment block or complex) or office (e.g. covering a single office or company or a plurality of offices or companies within a block or complex).

Further, at least a first one of the near-end user terminals 102a-102d is configured to detect presence of one or more second ones of the near-end terminals 102a-102d on the same wireless LAN or other such local or sub network. In this way the first and second near-end terminals may be determined to be approximately co-located, e.g. as they share the same home or office network.

At least one of the second near-end terminals is operable to be involved in the call established by the first near-end user terminal with one or more far-end terminals 102e, 102f, by providing a call-related service such as acting as a media end-point. In some example use cases, the first near-end terminal may be a laptop 102b, tablet or desktop computer 102c and the second near-end terminal may be a mobile phone 102a available to provide the service of providing a remote microphone or camera, to capture a voice or video stream of the call. In another example, the first near-end terminal may be a mobile phone 102a and the second near-end terminal may be a tablet, laptop 102b, desktop 102c or TV 102d available to provide the service of playing out a video stream of the call.

By way of example, consider now that the mobile phone 102a is the first user terminal and the laptop 102b, desktop 102c and TV 102d are the potential second user terminals. For illustrative purposes, the following will be discussed in terms of the first user terminal 102a discovering one of the potential second terminals 102d, but it will be appreciated that in embodiments any of the others may be discovered and/or that others may take on the role of the "first" user terminal.

In order to determine whether the first and second near-end terminals 102a, 102d are suitably co-located, it is possible to exploit knowledge of the network to which both the terminals 102a, 102d are connected. That is, the system exploits the fact that at least some portion of the network provides an infrastructure that is fixed, or at least can be assumed to be substantially fixed relative to the first and second terminals 102a, 102d. For example if it is known that the first terminal 102a is substantially co-located with a part of the near-end network 105 such as an access point or router, and the second terminal 102d is also known to be co-located with that same local or home network, and it is assumed that this network provides a fixed frame of reference, then it can be determined appropriate to consider the first terminal and second terminals 102a, 102d effectively co-located.

In an example use case, a user has both a mobile phone 102a and a household appliance such as a TV 102d connected to a home router 105. The two devices may be able to find each other because they are on the same local network 103, 105, e.g. same home WLAN. Further, the first device 102a can exploit the fact that the router 105 of this local network can be assumed to be a fixed reference point for the two devices, and thereby determine that it is substantially co-located with the second device 102d (e.g. in the same house or apartment).

In some alternative or additional embodiments, one or both of the first and second user terminals 102a, 102d may be equipped with at least one geographic location technology for determining the location of that mobile user terminal, in terms of geographic position relative to the surface of the earth; for example, a satellite based positioning system such as GPS (Global Positioning System, including potential variants such as assisted GPS or differential GPS), GLONASS (Global Navigation Satellite System) or Galileo; and/or trilateration (or more generally muiltilateration) relative to a plurality of different wireless base stations or access points having known locations; and/or a technique based on detecting signal strength relative to a known base station or access point. In another example, one or both of the first and second user terminals 102a, 102d may be registered with a location service allowing look-up of their geographic position from a server mapping device identifiers (e.g. IP addresses) to locations.

Note also that in embodiments, the second near-end terminal 102d (and/or 102c, 102b or other alternatives) need not comprise a full instance of the communication client 206. The complementary application on the second near-end terminal 102b-102d can be a "stripped down" or "dumb" version of the client that does not comprise call set-up protocol and is not in itself capable of establishing a call with any far-end terminal (like 102e and 102f), and may in fact have minimal capability. Nor in embodiments does the dumb client on the second near-end terminal(s) 102b-10d need to be logged into with the username of any particular user, or even have the concept to being logged in to by a user. Instead, the dumb client on the second near-end terminal(s) 102b-102d may comprise, in the least, a module for performing the relevant call-related service (e.g. playing out audio or video streamed to it over the local network 103, 105 or providing captured audio or video over the local network 103, 105); and a module for communicating its existence and available service(s) on the local network 103, 105.

Further, the function of notifying the user of nearby call-related services does not necessarily have to be implemented in any particular client application, e.g. it could be integrated into a suitable communication client such as a VoIP client or provided separately. Generally, the element 206 illustrated in FIG. 2 need not refer to any specific integrated application, but may refer to any portion or portions of code comprising (as well as any calling functionality) a notification module for notifying the user of one or more other devices in the vicinity.

An example method that the notification module 206 may be configured to perform is now described.

At a first step, the notification module 206 on the first near-end terminal 102a checks whether it can detect any second-near end terminal 102b-102d within a suitable proximity for providing call related services (more detail for implementing this will be discussed below). If so, the notification module 206 determines an identifier of the second near-end terminal, e.g. of TV 102d, such as an address identifying it on the local network 103, 105 or the wider network 101. In embodiments the detection may be performed by the notification module at the first near-end terminal 102a itself, or based on assistance from a server 104.

At a second step, the detection module 206 also detects the capabilities of the detected terminal 102d to determine whether it can provide any suitable call-related services, e.g. whether it can provide a screen for playing out video of a call (or e.g. whether it can act as remote microphone). For example this may comprise querying the second near-end terminal 102d over the local network 103, 105, or detecting a message advertised by the second near-end terminal 102d over the local network 103, 105. Thus the notification module is able to discover at least an indication that the second terminal 102d is nearby, an identifier of that second terminal 102d (e.g. its address), and an indication of one or more capabilities of the second terminal 102d (i.e. what service or services it can provide). The indication of the capability may comprise or include an indication of what type of device the second terminal 102d is, e.g. phone, tablet, laptop, TV, games console etc. Again in embodiments the detection may be performed by the notification module at the first near-end terminal 102a itself, or based on assistance from a server 104.

At a third step, if one such service from a second near-end terminal 102d was detected, the notification module 206 automatically outputs a notification to the user, e.g. on a screen of the first terminal 102a. The notification may indicate the second terminal's identity, type, the service and/or the proximity. In some embodiments the notification may comprise a user defined element, defined by a user of the first and/or second near-end terminal 102a, 102d (e.g. "Hi, this is my device, Dave"). In some further embodiments the notification may be dependent on what type of device the first terminal 102a is, or what type of device the second terminal 102d is, or on the combination of the types of the first and second terminals 102a, 102d. E.g. the notification that a TV set 102d is available for playing out the video of a call may be more emphatic when the first terminal 102a is a mobile phone (having a small screen) than if it is a tablet or laptop (having a larger screen), or alternatively the notification may only be displayed on condition that the first terminal 102a is a certain type of terminal like a mobile phone and not if it is another type like a tablet or laptop.

In embodiments, the notification may be output to the user at the time when the second device is detected. Alternatively, the notification may only be output to the user later when he or she makes an outgoing call, receives an incoming call (i.e. call request) or accepts an incoming call (i.e. "picks up").

Further, in embodiments the notification may prompt the user of the first near-end terminal 102a as to whether they wish to accept the offer of the call-related service from the second near-end terminal 102d. The notification module 206 receives the user's selection in response to this prompt and determines whether it is affirmative. If so, when the user makes or accepts a call using the first terminal, then the first terminal uses the service(s) of the confirmed second terminal in conjunction with the call.

The following now describes in more detail some examples for determining proximity between the first near-end terminal 102a and the second near-end terminal 102d (or any other such second near-end terminal), e.g. as implemented in the notification module 206.

Where two devices 102a, 102d share a common external IP address (e.g. public IP, or are on the same private network in the context of IPv6) it may be assumed that they are on the same near-end network. For a consumer this means that they are likely to be co-located geographically.

Where communication can be established between these devices (whether directly or with cloud assistance), this may provide a further validation in that these devices may be considered to have a degree of 'implicit trust' (although to a lesser degree in the case where cloud assistance is required). For example in the case where a home shares a common internet connection it is possible (and increasingly likely) that there might be devices sharing a common network.

Consider:—
  where a direct single hop IP connection can be made then likely they are on the same network and segment,
  where the devices share the same subnetwork (addressing space) then likely they are on the same network and segment,
  where the devices connect to a device with a common MAC interface address then likely they are on the same network and segment
(in these cases with a high degree of probability); or
  where the devices are able to connect to each other (multi-hop), but directly they are likely on the same network—e.g. two devices on a small wireless LAN having two routers
(in this case with a lower degree of probability).

One or more of these tests may also be combined with a shared token (either common user identity, passcode (as with Bluetooth), cryptographic key or other shared element—such shared key being prompted as a result of detection of any of the criteria above; then it can be assumed that there is a trust relationship.

There is an another option which to further refine the relative location dimension—which is the time taken for a packet to traverse the network between the two devices. In this context:—
  a RTT (round trip time) between the two devices provides a proxy for distance;
  this may be further refined by making allowances for intermediate devices (e.g. routers, switches etc.)—who's impact can be calculated; and/or
  the relative difference in time in RTT between the two devices and a fixed third point (assuming a common egress/ingress to the shared network defined above there is no real point in triangulating using two fixed external points) where a common RTT would increase probability of co-location;

Additionally, the fact that there may be multiple shared network paths between two devices using different network media, i.e. different types of access technology. For example wired, wireless LAN, personal area network (e.g. Bluetooth) and potentially other techniques might be used to further increase certainty. For instance:
  if the two devices can hear each other via an ad-hoc access technology like Bluetooth), this may indicate they are more likely to be close to one another than if only able to connect on the WLAN; or
  if the two devices are in range of one another via an ad-hoc access technology like Bluetooth, and are on the same WLAN (e.g. Wi-Fi), this may indicate they are more likely to be close to one another than if only able to connect on the WLAN.

In yet another embodiment, the first terminal 102a is arranged to determine its geographic location using a geographic location technology, such as GPS or another satellite based location technology, or such as cell triangulation (or more generally multilateration). The first terminal may then determine whether its geographic location is within an geographic area associated with the second terminal 102d, for example as follows.

The first device may determine its own geographic coordinates (e.g. GPS coordinates) and query the geographic coordinates (e.g. GPS coordinates) of the second device, e.g. querying that device for a read it has itself taken. The first device may then determine whether the two devices are within a threshold range based on these geographic coordinates.

Alternatively if the second device has a fixed location registered with a server of a location service, e.g. is a household appliance, the first device may look-up the geographic location of the second device, e.g. to find its postal address. The first device may then determine whether its geographic coordinates (e.g. GPS coordinates) are within a geographic area associated with the location returned from the location service, e.g. whether within an area on a map associated with the postal address.

In yet another alternative, it is possible for devices to make a determination using environmental data (which could be compared in the cloud, or fingerprints of the environment exchanged between the devices)—an example here would be that both devices sample the sound from their surroundings by sampling the sound the pattern of sound can be compared using peaks and troughs in sound and an accurate time reference to correlate the 'environments' around the devices. Alternatively the second device could introduce a sound into the environment which the first device attempts to detect, or vice versa. If the one device can hear the other, they may be determined to be co-located.

Thus in embodiments, proximity between a first user terminal and a second terminal may be determined based on sound data common to the first and second terminals, and detected by one or both of the two user terminals—either a sound profile of the environment in which the first and second mobile user terminals are located, or a sound deliberately emitted into the environment by one of the first and second terminals to be detected by the other.

In the first case, each of the first and second user captures sound data from its surroundings and the sound data from the two are compared (at either terminal or another network element such as a server). The sound could be an incidental ambient sound such as background music or background conversation, or a sound deliberately introduced into the environment by another element for that purpose, e.g. a sound signature emitted by the router or access point. If the sound detected by the first and second terminals is found to be sufficiently similar, e.g. based on a correlation or pattern matching algorithm, then it may be determined that the terminals are likely to be in the same environment (e.g. same room) and therefore in effect co-located to within an acceptable degree of proximity.

In the second case one of the first and second terminals deliberately emits a sound signature into the environment, and the other of the first and second terminals determines whether it can detect the signature, e.g. by matching to a predetermined instance of the signature stored at that terminal. If so it may be determined that the terminals are likely to be in the same environment (e.g. same room) and therefore in effect co-located to within an acceptable degree of proximity.

In embodiments any one or a combination of the above tests may be applied. The tests may be determined for example by the notification module 206 of the first terminal 102a querying the second terminal 102b (and/or 102c, 102d etc.), or by querying a network element such as a router, access point or server which has record of the relevant information about the second terminal (e.g. the fact that it connects to the same sub network, and/or its IP address, etc.).

It will be appreciated that the above embodiments have been described only by way of example. Other variants or implementations may become apparent to a person skilled in the art given the disclosure herein. For example, embodiments could enable a voice or video call to be conducted using the secondary terminal to consume or generate at least one stream of the call whilst the first user terminal concurrently generates or consumes at least another stream of the call, or all stream(s) could be handled by the secondary terminal whilst the first terminal only controls the call. Further, embodiments are not limited by any particular method of resource discovery or authorisation, and any of the above-described examples could be used, or indeed others. Further, any of the above embodiments may be implemented either independently or in combination. Where it is referred to a server this is not necessarily intended to limit to a discrete server unit housed within a single housing or located at a single site. Further, where it is referred to an application, this is not necessarily intended to refer to a discrete, stand-alone, separately executable unit of software, but could alternatively refer to any portion of code such as a plug-in or add-on to an existing application.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of conducting voice or video calls over a network between a first near-end device and at least one far-end device, using a client application of a packet-based communication system, the method comprising:
    discovering a proximity, to the first near-end device, of at least one second near-end device that is available to provide a resource for use by a near-end user in conjunction with the first near-end device when conducting one of said calls, the proximity discovered by detection of a sound in an environment common to the first near-end device and the second near-end device, the detection of the sound based on one or more of a correlation or pattern matching of a sound detected by the first near-end device and the second near-end device, the resource being for use in conducting at least part of the call or in conjunction with the call, and the first near-end device being a mobile user terminal of the near-end user;
    based on the discovering said proximity, presenting the near-end user with a message indicating the availability of the second near-end device to provide said resource when conducting said call;
    prompting the near-end user for a user selection as to whether to accept the second near-end device for use as said resource; and
    responsive to the near-end user accepting to use the second near-end device, using the second near-end device to play out or generate at least one audio or video stream of the call, while the first near-end device controls the call.

2. The method of claim 1, wherein the discovering said proximity is further based on the first near-end device and the second near-end device being connected to a same local network.

3. The method of claim 1, wherein the discovering said proximity is further based on one or more of:
    the first and second near-end devices sharing an address space being a subset of addresses of a packet-based network,
    the first and second near-end devices both connecting to a same network interface address of an intermediate network equipment,
    the first and second near-end devices being separated by no more than a threshold number of network hops,
    a transmission time of a packet travelling between the first and second near-end devices,
    a type of access technology currently available for communicating between the first and second near-end devices, or
    using a geographic localization technology to detect that a geographic location of the first near-end device is within a proximity of a geographic location of the second near-end device.

4. The method of claim 1, wherein the second near-end device is a user terminal having at least one audio and/or video transducer, and the method further comprises providing the resource to enable the voice or video call to be conducted using the second near-end device to consume or generate the at least one audio or video stream of the call, whilst the first near-end device concurrently generates or consumes at least another audio or video stream of the call, or controls the call.

5. The method of claim 1, wherein the presenting the near-end-user with said message is performed at the time the proximity is discovered.

6. The method of claim 1, wherein the message is presented in response to the near-end user initiating an outgoing call from the first near-end device, or receiving or accepting an incoming call.

7. The method of claim 1, wherein the discovering said proximity uses a server-assisted discovery process.

8. Equipment for use in a first near-end device being a mobile user terminal of a near-end user, the equipment comprising:
    a transceiver operable to conduct voice or video calls with at least one far-end device via a network; and
    a notification module configured to:
        discover proximity of at least one second near-end device that is available to provide a call-related service in relation to one of said voice or video calls, the proximity discovered by detection of a sound in an environment common to the first near-end device and the second near-end device, the detection of the sound based on one or more of a correlation or pattern matching of a sound detected by the first near-end device and the second near-end device;
        based on discovering said proximity, output a notification notifying the near-end user of said call-related service;
        prompt the near-end user for a user selection as to whether to accept the second near-end device to provide the call-related service in relation to one of said voice or video calls; and
        responsive to the near-end user accepting to use the second near-end device, use the second near-end device to play out or generate at least one audio or video stream of the call, while the first near-end device controls the call.

9. The equipment of claim 8, wherein the notification module is further configured to detect said proximity based on the first near-end device and the second near-end device being connected to a same local network.

10. The equipment of claim 8, wherein the notification module is further configured to detect said proximity based on one or more of:
    the first and second near-end devices sharing an address space being a subset of addresses of a packet-based network,
    the first and second near-end devices both connecting to a same network interface address of an intermediate network equipment,
    the first and second near-end devices being separated by no more than a threshold number of network hops,
    a transmission time of a packet travelling between the first and second near-end devices,
    a type of access technology currently available for communicating between the first and second near-end devices, or using a geographic localization technology to detect that a geographic location of the first near-end devices is within a proximity of a geographic location of the second near-end device.

11. The equipment of claim 8, wherein the second near-end device is a user terminal having at least one audio and/or video transducer, and the call-related service comprises enabling the voice or video call to be conducted using the second near-end device to consume or generate the at least one audio or video stream of the call, whilst the first near-end device concurrently generates or consumes at least another audio or video stream of the call, or controls the call.

12. The equipment of claim 9, wherein the notification module is configured to output said notification at the time the proximity is discovered.

13. The equipment of claim 12, wherein the notification comprises a graphical icon displayed on a screen of the first near-end device.

14. The equipment of claim 13, wherein the notification enables the user to use of the call related-service with a single click on the icon.

15. The equipment of claim 8, wherein the notification module is configured to present the near-end user with said message in response to the near-end user initiating an outgoing call from the first near-end device, or receiving or accepting an incoming call.

16. The equipment of claim 8, wherein the notification module is configured to discover said proximity using a server-assisted discovery process.

17. The equipment of claim 8, wherein the notification comprises a user-defined message.

18. A system comprising:
one or more processors; and
one or more memory devices comprising instructions executable, by the one or more processors, to configure a first near-end terminal, the first near-end terminal being a mobile terminal operable to establish packet-based voice or video calls with at least one far-end terminal over a network, to:
discover the first near-end terminal is within a relative proximity of a second near-end terminal that is available to act as an audio or video end-point for one of said voice or video calls, the relative proximity discovered by detection of a sound in an environment common to the first near-end terminal and the second near-end terminal, the detection of the sound based on one or more of a correlation or pattern matching of a sound detected by the first near-end terminal and the second near-end terminal;
responsive to said discovery of the relative proximity, output a notification to a user of the first near-end terminal, the notification notifying the user of the availability of the second near-end user terminal to act as the audio or video endpoint for the one of the calls;
prompt the user for a user selection as to whether to accept the second near-end terminal for use as said audio or video end-point; and
responsive to the user accepting to use the second near-end terminal, use the second near-end terminal to play out or generate at least one voice or video stream of the call, while the first near-end terminal controls the call.

19. The system of claim 18, wherein the discovery of said proximity is further based on the first near-end terminal and the second near-end terminal being connected to a same local network.

20. The system of claim 18, wherein the discovery of said proximity is further based on one or more of:
the first and second near-end terminals sharing an address space being a subset of addresses of a packet-based network,
the first and second near-end terminals both connecting to a same network interface address of an intermediate network equipment,
the first and second near-end terminals being separated by no more than a threshold number of network hops,
a transmission time of a packet travelling between the first and second near-end terminals,
a type of access technology currently available for communicating between the first and second near-end terminals, or
using a geographic localization technology to detect that a geographic location of the first near-end terminal is within a proximity of a geographic location of the second near-end terminal.

* * * * *